United States Patent
Mozer et al.

(10) Patent No.: US 10,152,974 B2
(45) Date of Patent: Dec. 11, 2018

(54) UNOBTRUSIVE TRAINING FOR SPEAKER VERIFICATION

(71) Applicant: Sensory, Incorporated, Santa Clara, CA (US)

(72) Inventors: Todd F. Mozer, Los Altos Hills, CA (US); Bryan Pellom, Erie, CO (US)

(73) Assignee: Sensory, Incorporated, Santa Clara, CA (US)

( * ) Notice: Subject to any disclaimer, the term of this patent is extended or adjusted under 35 U.S.C. 154(b) by 0 days.

(21) Appl. No.: 15/457,911

(22) Filed: Mar. 13, 2017

(65) Prior Publication Data
US 2017/0301353 A1    Oct. 19, 2017

Related U.S. Application Data

(60) Provisional application No. 62/323,038, filed on Apr. 15, 2016.

(51) Int. Cl.
  *G10L 17/04* (2013.01)
  *G10L 17/02* (2013.01)
  *G10L 17/22* (2013.01)

(52) U.S. Cl.
  CPC .............. *G10L 17/04* (2013.01); *G10L 17/02* (2013.01); *G10L 17/22* (2013.01)

(58) Field of Classification Search
  CPC ................................ G10L 15/22; G10L 17/00
  See application file for complete search history.

(56) References Cited

U.S. PATENT DOCUMENTS

| | | | | |
|---|---|---|---|---|
| 6,424,946 B1* | 7/2002 | Tritschler | ............ | G06F 17/3074 704/251 |
| 6,564,185 B1* | 5/2003 | Miyazawa | .............. | G10L 15/22 704/235 |
| 2003/0036903 A1* | 2/2003 | Konopka | .............. | G10L 15/065 704/249 |
| 2013/0311184 A1* | 11/2013 | Badavne | ................. | G10L 15/14 704/250 |
| 2015/0162006 A1* | 6/2015 | Kummer | ............ | G07C 9/00571 704/275 |

* cited by examiner

*Primary Examiner* — Shreyans A Patel
(74) *Attorney, Agent, or Firm* — Fountainhead Law Group P.C.

(57) ABSTRACT

Techniques for implementing unobtrusive training for speaker verification are provided. In one embodiment, an electronic device can receive a plurality of voice samples uttered by one or more users as they interact with a voice command-and-control feature of the electronic device and, for each voice sample, assign the voice sample to one of a plurality of voice type categories. The electronic device can further group the voice samples assigned to each voice type category into one or more user sets, where each user set comprises voice samples likely to have been uttered by a unique user. The electronic device can then, for each user set: (1) generate a voice model, (2) issue, to the unique user, a request to provide an identity or name, and (3) label the voice model with the identity or name provided by the unique user.

27 Claims, 3 Drawing Sheets

UNOBTRUSIVE TRAINING FOR SPEAKER VERIFICATION

CROSS-REFERENCES TO RELATED APPLICATIONS

The present application claims the benefit and priority of U.S. Provisional Patent Application No. 62/323,038, filed Apr. 15, 2016, entitled "UNOBTRUSIVE TRAINING FOR TEXT-INDEPENDENT SPEAKER VERIFICATION." The entire contents of this application are incorporated herein by reference in its entirety for all purposes.

BACKGROUND

In the field of computer-based speech recognition, speaker verification refers to the task of determining whether a speech sample of an unknown voice corresponds to the voice of a particular enrolled user. One of the challenges in implementing speaker verification pertains to the user enrollment/training process. For text-dependent speaker verification systems (i.e., systems that depend on a pre-defined passphrase), a user can train and thus enroll his/her voice by uttering the passphrase a small number of times. However, such systems are limited because they can only recognize an enrolled user based on his/her utterance of the passphrase (rather than general speech). Further, although the training process is relatively short, problems can still emerge if extraneous words or sounds are captured during this process, which can lead to frustration on the part of the user.

Text-independent speaker verification systems are more flexible than text-dependent systems because they can recognize an enrolled user without requiring the user to say a particular passphrase. This allows for different types of verification methods, such as "continuous verification" while the user is speaking. At the same time, the enrollment/training process for text-independent systems is typically much longer and more intensive. For example, such systems typically require a user to enroll his/her voice by uttering a large number of phonetically balanced sentences in order to model all possible phrases that the user might speak at the time of verification. As a result, the training process for a text-independent speaker verification system can be extremely burdensome for its users.

SUMMARY

Techniques for implementing unobtrusive training for speaker verification are provided. In one embodiment, an electronic device can receive a plurality of voice samples uttered by one or more users as they interact with a voice command-and-control feature of the electronic device and, for each voice sample, assign the voice sample to one of a plurality of voice type categories. The electronic device can further group the voice samples assigned to each voice type category into one or more user sets, where each user set comprises voice samples likely to have been uttered by a unique user. The electronic device can then, for each user set: (1) generate a voice model, (2) issue, to the unique user, a request to provide an identity or name, and (3) label the voice model with the identity or name provided by the unique user.

A further understanding of the nature and advantages of the embodiments disclosed herein can be realized by reference to the remaining portions of the specification and the attached drawings.

DETAILED DESCRIPTION

Figure 1:
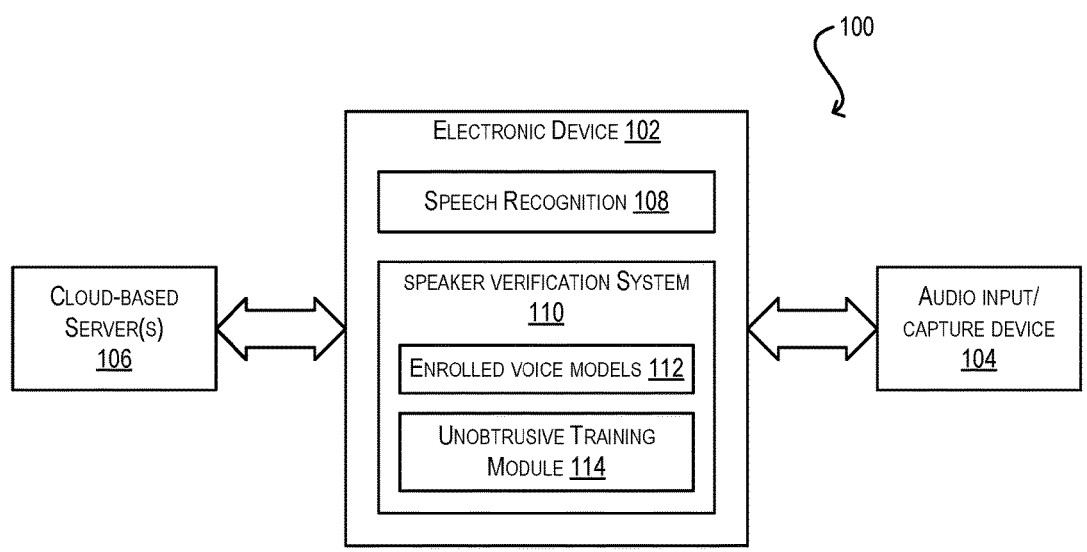
FIG. 1 depicts a block diagram of a system environment according to one embodiment.

In the following description, for purposes of explanation, numerous examples and details are set forth in order to provide an understanding of specific embodiments. It will be evident, however, to one skilled in the art that certain embodiments can be practiced without some of these details, or can be practiced with modifications or equivalents thereof.

1. Overview

Embodiments of the present disclosure are directed to techniques that allow user training for speaker verification to be performed in an unobtrusive manner. According to one set of embodiments, an electronic device comprising a speech recognition system and a speaker verification system can receive voice samples that are uttered by one or more users as they interact with a voice command-and-control feature of the device. The electronic device may be, e.g., a smartphone, a tablet, a smartwatch, a smart speaker, a computer system, a media/set-top box, a smart television, or any other device that is designed to implement voice command-and-control. In one embodiment, the voice samples can correspond to utterances of a predefined word or phrase, such as voice trigger used by the voice command-and-control feature. In other embodiments, the voice samples can correspond to arbitrary words or phrases, such as voice queries/commands uttered after the voice trigger.

Upon receiving each voice sample, the electronic device can perform a first classification step that involves assigning the voice sample to one of a plurality of "voice type" categories. For example, each voice type category may correspond to a particular voice type model that has been pre-trained on the device/system, and the first classification step can comprise assigning the voice sample to the voice type model that most closely matches the vocal characteristics of the sample.

At a later point in time (e.g., after the electronic device has performed the first classification step on a relatively large number of received voice samples), the device can perform a second classification step that involves grouping one or more voice samples in a given voice type category into a "user set" that is believed to be associated with a particular unique user. For instance, for voice type category A, this second classification step can comprise grouping voice samples S1, S2, and S3 into a user set US1 that is believed to be uttered by a single unique user U1. Upon determining this user set, the electronic device can automatically generate a voice model for the associated user (whose specific identity is still unknown at this point). In the cases where the voice samples comprise predefined words/phrases, the generated voice model can be a text-dependent voice model. Alternatively, in cases where the voice samples comprise arbitrary words/phrases, the generated voice model can be a text-independent voice model.

Then, the next time that specific user utters something (in other words, the next time the device receives a voice sample that matches the voice model generated for the user), the electronic device can ask the user (either verbally or through text) for his/her identity/name. In this way, the device can attach that identity/name as a label to the voice model and user set and thereby enroll the user into the device's speaker verification system.

Finally, the electronic device can use the labeled voice model to verify the user's identity with respect to future interactions between the user and the device. For example, the electronic device may be a shared household device such as a smart speaker. In this and other similar scenarios, the electronic device can provide a user interface that allows an administrator to assign permissions with respect to allowable voice commands/queries for each enrolled user, and the device can enforce those permissions at the time of receiving a future utterance of a voice trigger and subsequent voice query from a particular user (i.e., verify the user's identity via his/her enrolled voice model and determine whether the identified user has sufficient permissions to submit that voice query).

With the general approach described above, both text-dependent and text-independent speaker verification can be achieved without imposing a burdensome explicit training process on users. Instead, the speaker verification system can be trained automatically and unobtrusively while users interact normally with voice command-and control feature of the electronic device (by submitting voice triggers and/or voice commands/queries). These and other aspects of the present disclosure are described in further detail in the sections that follow.

2. System Environment

FIG. 1 depicts an example system environment 100 in which embodiments of the present disclosure may be implemented. As shown, system environment 100 includes an electronic device 102 that is communicatively coupled to an audio input/capture device 104 and optionally to one or more cloud-based server(s) 106. Audio input/capture device 104 can be, e.g., a microphone, voice recorder, headset, or the like. In certain embodiments, audio input/capture device 104 can be incorporated into (i.e., integrally included in) electronic device 102. In other embodiments, audio input/capture device 104 can be separate from electronic device 102 and can communicate with device 102 via an external connection mechanism (e.g., a point-to-point cable or wireless protocol, a local or wide area network, etc.).

Electronic device 102, which includes a speech recognition system 108 and a speaker verification system 110, can be any type of device known in art that is capable of receiving and responding to voice commands/queries (i.e., implements a "voice command-and-control" feature). Merely by way of example, electronic device 102 may be a smartphone, a tablet, a smartwatch, a smart speaker, a computer system, a media/set-top box, or a smart television. One of ordinary skill in the art will recognize other possibilities for the nature of device 102.

In operation, electronic device 102 can receive a predefined voice trigger from a user via audio input/capture device 104 and, upon detecting the voice trigger, can process a follow-on voice query/command using speech recognition system 108. Electronic device can then access one or more data stores (residing on, e.g., cloud-based server(s) 106) in order to generate a response and return the response to the user.

In addition, electronic device 102 can verify the identity of a given user via speaker verification system 110 in order to authorize certain user actions. Speaker verification system 110 can be either a text-dependent system or a text-independent system. In the former case, system 110 can perform speaker verification by receiving a voice sample of a predefined word or phrase from the user, comparing the voice sample against one or more enrolled text-dependent user voice models 112, and then determining whether a match is found between the sample and a particular text-dependent voice model (indicating that the user is an enrolled user). In the latter, case, system 110 can perform speaker verification by receiving a general voice sample of arbitrary words or phrases from the user, comparing the voice sample against one or more enrolled text-independent user voice models 112, and then determining whether a match is found between the sample and a particular text independent voice model (indicating that the user is an enrolled user).

As noted in the Background section, the process of enrolling/training users for both text-dependent and text-independent speaker verification (and thereby generating appropriate voice models for the users) can be a burdensome and error-prone process. To address this problem, speaker verification system 110 of FIG. 1 is enhanced to include a novel unobtrusive training module 114. As detailed below, unobtrusive training module 114 can unobtrusively collect voice training samples from users as they interact normally with electronic device 102's voice command-and-control feature. Unobtrusive training module 114 can then automatically generate user-specific text-dependent or text-independent voice models based on the collected samples. In this way, module 114 can eliminate the need to impose a burdensome training process on users for the purpose of speaker verification.

It should be appreciated that system environment 100 is illustrative and not intended to limit embodiments of the present disclosure. For example, although speech recognition system 108 and speaker verification system 110 are shown as being implemented on electronic device 102, in other embodiments some or all of the functionality attributed to these systems may be implemented on a remote device/system such as cloud-based server(s) 106. Further, electronic device 102 may include other components (such as additional input devices or biometric sensors) or perform other functions that are not explicitly described. One of ordinary skill in the art will recognize many variations, modifications, and alternatives.

3. Unobtrusive Training Workflow

Figure 2:
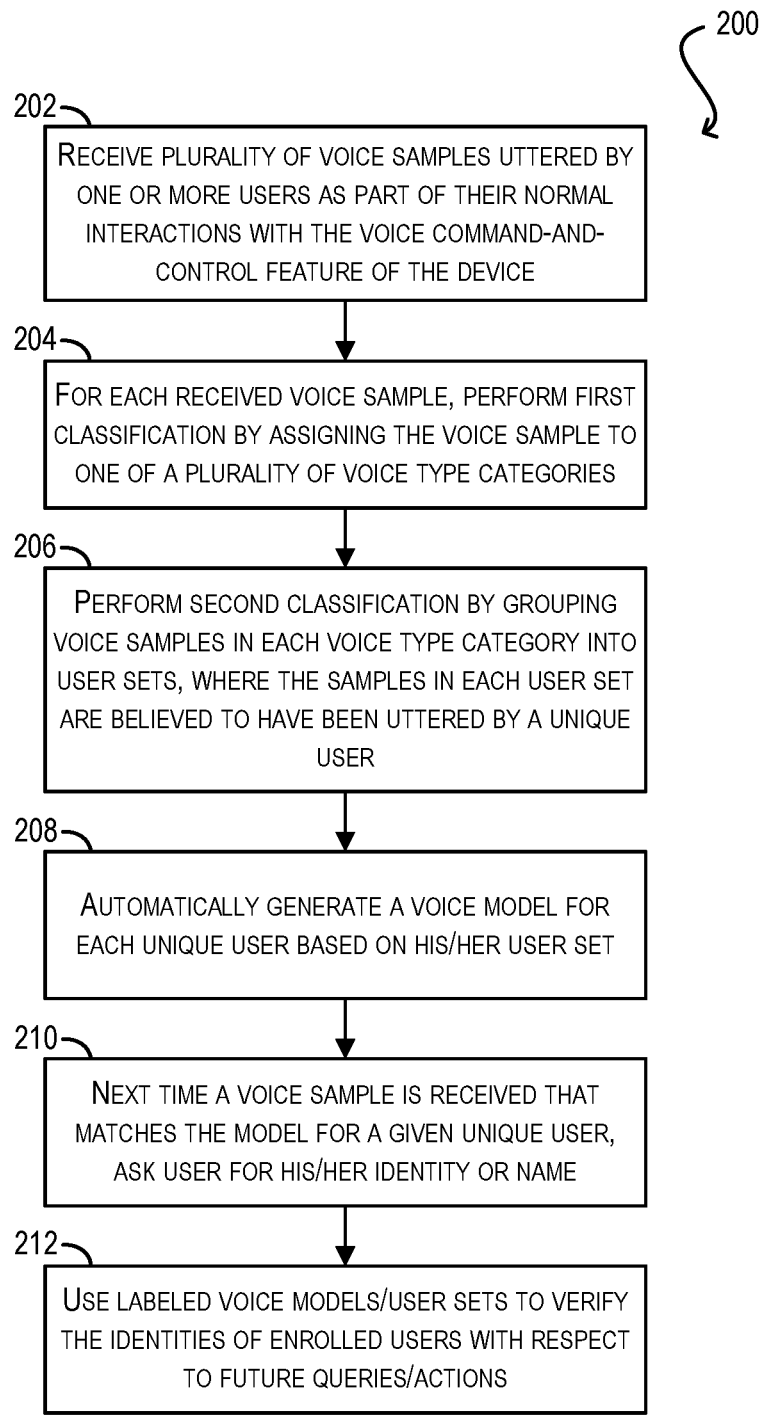
FIG. 2 depicts a workflow for implementing unobtrusive training for speaker verification according to one embodiment.

FIG. 2 depicts a workflow 200 that may be executed by electronic device 102 of FIG. 1 for implementing unobtrusive training for speaker verification according to an embodiment. Workflow 200 may be used for unobtrusive training of both text-dependent and text-independent verification systems.

Starting with block 202, electronic device 102 can receive (via audio input/capture device 104) a plurality of voice samples that are uttered by one or more users as part of their interaction with the voice command-and-control feature of device 102. In the case where unobtrusive training is desired for text-dependent speaker verification, the voice samples received at block 202 can correspond to, e.g., user utterances of the pre-defined voice trigger understood by the device (e.g., "Siri" or "Alexa"). In the cases where unobtrusive training is desired for text-independent speaker verification, the voice samples received at block 202 can correspond to, e.g., voice queries and/or commands that are submitted to the device after the utterance of the voice trigger (e.g., "what is the weather like today?" or "play the latest album from Adele").

At block 204, for each received voice sample, unobtrusive training module 114 of electronic device 102 can perform a first classification step that involves assigning the voice sample to one of a plurality of voice type categories. For example, in one embodiment speaker verification system 110 can include a set of N Gaussian Mixture Models (GMMs), where each GMM is pre-trained using a particular type of voice. In this embodiment, unobtrusive training module 114 can extract features from the received voice sample (e.g., time-synchronous Mel-Frequency Cepstral Coefficients) and apply the extracted features to each GMM in order to compute a probability that the sample corresponds to that model's voice type. Module 114 can then assign the voice sample to the voice type category corresponding to the GMM that produces the highest probability.

In another embodiment, unobtrusive training module 114 can perform the first classification step of block 204 using a neural network classifier that has been pre-trained to discriminate between one of N different voice types. In this case, the received voice sample can be provided as input to the neural network classifier, and the neural network output corresponding to the most-likely voice type can be used to classify the sample.

At block 206, after a sufficiently large number of voice samples have been received and initially classified per block 204, unobtrusive training module 114 can perform a second classification step that involves grouping the voice samples in each voice type category into separate user sets, where all of the samples in a given user set are believed to have been uttered by a single unique user. For instance, for voice type category A, this second classification step can comprise grouping voice samples S1, S2, and S3 into a user set US1 that is believed to be uttered by a unique user U1, grouping user queries S4, S5, and S6 into another user set US2 that is believed to be uttered by another unique user U2, and so on. This process can be repeated for all of the voice type categories in the system.

The specific timing for this second classification step, as well as the manner in which it is performed, can differ in various embodiments. For instance, for a given voice type category, unobtrusive training module 114 can decide when sufficient information has been collected to be confident of one or more unique users by analyzing the quantity and similarity of voice characteristics of samples assigned to that voice type category. The quantity of this data can be measured in terms of, e.g., phonemes, syllables, or by seconds of speech captured/recorded. The similarity of this data may be measured by, e.g., measuring acoustic distances (probabilities in the case of GMMs and entropy in the case of a neural network classifier) between the voice samples assigned to the voice type category. For neural network classifiers, the entropy of the network outputs can be used as a confidence metric for the assigned voice type category.

Upon completing the second classification step at block 206, unobtrusive training module 114 can automatically generate a voice model for each unique user based on his/her user set (block 208). This voice model can be text-dependent (in the embodiment where the voice samples all correspond to the same pre-defined voice trigger) or text-independent (in the embodiment where the voice samples correspond to arbitrary/free form speech). Note that the specific identities of the unique users are not yet known at this point (module 114 simply knows that certain voice samples can be attributed to certain unique users).

Then, the next time one of these unique users provides a voice sample to electronic device 102 (in other words, the next time device 102 receives a voice sample that matches the voice model generated for that user), unobtrusive training module 114 can ask the user (either verbally or through text) for his/her identity/name (block 210). In this way, model 114 can attach that identity/name as a label to the voice model and user set for the user generated at block 208 and thereby formally enroll the user into speaker verification system 110.

Finally, at block 212, speaker verification system 110 can use the labeled voice models/user sets to verify the identities of enrolled users with respect to future interactions with electronic device 102. For example, as mentioned previously, electronic device 102 may be a home consumer electronic device (e.g., a smart speaker, a media streaming device, a smart television, etc.) that can be used by a number of people that share a home. In this case, electronic device 102 can provide a user interface that allows an administrator to assign permissions with respect to allowable voice commands/queries for each person, and the device can enforce those permissions at the time of receiving a future voice trigger and follow-on command/query from a particular user and verifying the user's identity via his/her enrolled voice model.

The voice queries can be, e.g., requests for information (e.g. "what time is it?") or action requests (e.g. "set an alarm for 12:30"), or simply entertainment ("play Django music"). Some queries may be available to any household user, but other queries may be rejected by unauthorized users. The unobtrusive biometric training techniques of the present disclosure allow the different users to be known and identified. For example, system 110 could allow anyone to play music, but watching adult videos, checking account balances, or placing orders for goods could be restricted.

Generally speaking, activities that could be restricted to certain users may include: (1) those which are defined within the device by the users, (2) activities associated with certain applications on mobile devices or in the cloud that the device might connect to, and/or (3) activities based on individuals' histories of usage. For example, item (1) might be for a video product where a parent would restrict movie watching to the children. Item (2) might be associating the device with a banking app and checking account balances or ordering goods from Amazon. Item (3) may include things like the device making recommendations based on the individual's history such as movie recommendations or purchasing recommendations.

It should be appreciated that workflow 200 of FIG. 2 is illustrative and various modifications and enhancements are possible. For example, after the secondary classification at block 206 is completed, subsequently received voice samples can be classified automatically into the known, labeled user sets and/or alternatively assigned to an empty set (corresponding to an unknown voice label). For known users, the corresponding voice model can be automatically updated and improved based on this newly received voice data. Further, as additional voice samples are received, samples corresponding to an unknown user can be passed again through the first classification step of block 204 until sufficient data is collected to identify a new unique user.

As another example, in addition to dynamically updating the voice models used for speaker verification, in some embodiments electronic device 102 can also use voice samples that are subsequently received from known users in order to create and/or update speech recognition models that are specifically adapted for those users. In this way, electronic device 102 can improve the accuracy of the speech recognition it performs on the voice queries or commands received from each user.

As another example, although workflow 200 describes the first and second classification steps as being performed based on vocal characteristics of the received voice sample, in some embodiments these classification steps can also be enhanced using other biometrics or data that are collected unobtrusively from users (e.g., smell, query type, word usage, blue-tooth connection from a 2nd factor device, etc.). For instance, in one embodiment, electronic device 102 can incorporate a facial recognition system can that is used to identify the individual uttering the voice sample, verify that the lips on the face are moving while producing the sample audio, and then associate the face and voice together to perform the first classification step. Similar clustering methods such as measuring distances between stored templates of a face recognition system can be used to cluster faces into groups of known and unknown users and to later assist in assigning labels for the second classification step. In addition, other visual cues may also be used to aid in performing these classifications, which may include, but are not limited to, subject height, hair style and color, and distinctive body characteristics.

As yet another example, in some embodiments unobtrusive training module 114 can execute multiple instances of workflow 200 in parallel for multiple different voice triggers. For example, module 114 may collect voice samples and build text-dependent models for the predefined voice trigger "Siri" and at the same time collect voice samples and text-dependent models for the predefined voice trigger "Alexa." In this way, module 114 can be used to perform unobtrusive training that is applicable to several different types of voice command-and-control systems at once. One of ordinary skill in the art will recognize other variations, modifications, and alternatives.

4. Example Computing Device/System

Figure 3:
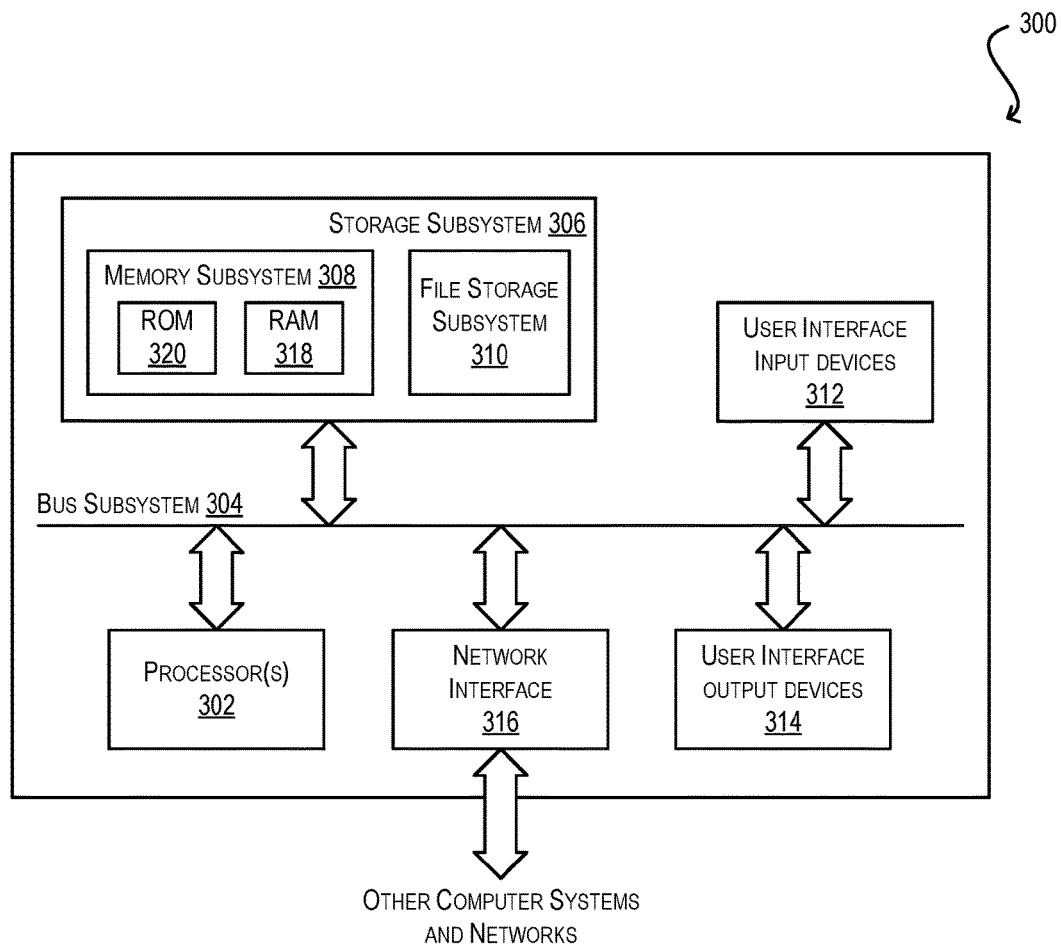
FIG. 3 depicts a block diagram of a computing device/system according to one embodiment.

FIG. 3 depicts an example computing device/system 300 according to an embodiment. Computing device/system 300 may be used to implement the "electronic device" depicted in FIG. 1 and described throughout this disclosure.

As shown, computing device/system 300 can include one or more processors 302 that communicate with a number of peripheral devices via a bus subsystem 304. These peripheral devices can include a storage subsystem 306 (comprising a memory subsystem 308 and a file storage subsystem 310), user interface input devices 312, user interface output devices 314, and a network interface subsystem 316.

Bus subsystem 304 can provide a mechanism for letting the various components and subsystems of computing device/system 300 communicate with each other as intended. Although bus subsystem 304 is shown schematically as a single bus, alternative embodiments of the bus subsystem can utilize multiple buses.

Network interface subsystem 316 can serve as an interface for communicating data between computing device/system 300 and other computing devices or networks. Embodiments of network interface subsystem 316 can include wired (e.g., coaxial, twisted pair, or fiber optic Ethernet) and/or wireless (e.g., Wi-Fi, cellular, Bluetooth, etc.) interfaces.

User interface input devices 312 can include a keyboard, pointing devices (e.g., mouse, trackball, touchpad, etc.), a scanner, a barcode scanner, a touch-screen incorporated into a display, audio input devices (e.g., voice recognition systems, microphones, etc.), and other types of input devices. In general, use of the term "input device" is intended to include all possible types of devices and mechanisms for inputting information into computing device/system 300.

User interface output devices 314 can include a display subsystem, a printer, a fax machine, or non-visual displays such as audio output devices, etc. The display subsystem can be a cathode ray tube (CRT), a flat-panel device such as a liquid crystal display (LCD), or a projection device. In general, use of the term "output device" is intended to include all possible types of devices and mechanisms for outputting information from computing device/system 300.

Storage subsystem 306 can include a memory subsystem 308 and a file/disk storage subsystem 310. Subsystems 308 and 310 represent non-transitory computer-readable storage media that can store program code and/or data that provide the functionality of various embodiments described herein.

Memory subsystem 308 can include a number of memories including a main random access memory (RAM) 318 for storage of instructions and data during program execution and a read-only memory (ROM) 320 in which fixed instructions are stored. File storage subsystem 310 can provide persistent (i.e., non-volatile) storage for program and data files and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computing device/system 300 is illustrative and many other configurations having more or fewer components than computing device/system 300 are possible.

The above description illustrates various embodiments along with examples of how aspects of the embodiments may be implemented. The above examples and embodiments should not be deemed to be the only embodiments, and are presented to illustrate the flexibility and advantages of the present invention as defined by the following claims. For example, although certain embodiments have been described with respect to particular process flows and steps, it should be apparent to those skilled in the art that the scope of the present invention is not strictly limited to the described flows and steps. Steps described as sequential may be executed in parallel, order of steps may be varied, and steps may be modified, combined, added, or omitted. As another example, although certain embodiments have been described using a particular combination of hardware and software, it should be recognized that other combinations of hardware and software are possible, and that specific operations described as being implemented in software can also be implemented in hardware and vice versa.

The specification and drawings are, accordingly, to be regarded in an illustrative rather than restrictive sense. Other arrangements, embodiments, implementations and equivalents will be evident to those skilled in the art and may be employed without departing from the spirit and scope of the invention as set forth in the following claims.

What is claimed is:

1. A method comprising:
  receiving, by an electronic device, a plurality of voice samples uttered by one or more users as they interact with a voice command-and-control feature of the electronic device;

for each voice sample, assigning, by the electronic device, the voice sample to one of a plurality of voice type categories;

for each voice type category, grouping, by the electronic device, voice samples assigned to the voice type category into one or more user sets, each user set comprising one or more voice samples likely to have been uttered by a unique user in the one or more users; and for each user set:
 generating, by the electronic device, a voice model;
 issuing, by the electronic device to the unique user, a request to provide an identity or name; and
 labeling, by the electronic device, the voice model with the identity or name provided by the unique user.

2. The method of claim 1 wherein the assigning of the voice sample to one of the plurality of voice type categories is based on vocal characteristics of the voice sample.

3. The method of claim 1 wherein the assigning of the voice sample to one of the plurality of voice type categories is further based on one or more other biometric factors associated with the utterance of the voice sample.

4. The method of claim 1 wherein the grouping of voice samples assigned to the voice type category into one or more user sets is based on a quantity of the voice samples and similarity of vocal characteristics between the voice samples.

5. The method of claim 1 further comprising:
 using the labeled voice models to verify the one or more users' identities with respect to future voice queries or actions.

6. The method of claim 5 wherein using the labeled voice models to verify the one or more users' identities with respect to future voice queries or actions comprises, for a particular user:
 allowing or disallowing a voice query or an action initiated by the particular user based on the particular user's identity and one or more permissions defined on the electronic device.

7. The method of claim 5 further comprising:
 upon verifying the identity of a particular user using the user's labeled voice model, creating or adapting a speech recognition model that is specific to the particular user based on voice samples received from the particular user.

8. The method of claim 1 further comprising, subsequently to the labeling:
 receiving another voice sample that belongs to a particular user set; and
 updating the voice model generated from the particular user set based on vocal characteristics of said another voice sample.

9. The method of claim 1 wherein the generated voice model is a text-dependent or text-independent voice model.

10. A non-transitory computer readable storage medium having stored thereon program code executable by a processor of an electronic device, the program code causing the processor to:
 receive a plurality of voice samples uttered by one or more users as they interact with a voice command-and-control feature of the electronic device;
 for each voice sample, assign the voice sample to one of a plurality of voice type categories;
 for each voice type category, group voice samples assigned to the voice type category into one or more user sets, each user set comprising one or more voice samples likely to have been uttered by a unique user in the one or more users; and for each user set:
 generate a voice model;
 issue, to the unique user, a request to provide an identity or name; and
 label the voice model with the identity or name provided by the unique user.

11. The non-transitory computer readable storage medium of claim 10 wherein the assigning of the voice sample to one of the plurality of voice type categories is based on vocal characteristics of the voice sample.

12. The non-transitory computer readable storage medium of claim 10 wherein the assigning of the voice sample to one of the plurality of voice type categories is further based on one or more other biometric factors associated with the utterance of the voice sample.

13. The non-transitory computer readable storage medium of claim 10 wherein the grouping of voice samples assigned to the voice type category into one or more user sets is based on a quantity of the voice samples and similarity of vocal characteristics between the voice samples.

14. The non-transitory computer readable storage medium of claim 10 wherein the program code further causes the processor to:
 use the labeled voice models to verify the one or more users' identities with respect to future voice queries or actions.

15. The non-transitory computer readable storage medium of claim 14 wherein using the labeled voice models to verify the one or more users' identities with respect to future voice queries or actions comprises, for a particular user:
 allowing or disallowing a voice query or an action initiated by the particular user based on the particular user's identity and one or more permissions defined on the electronic device.

16. The non-transitory computer readable storage medium of claim 14 wherein the program code further causes the processor to:
 upon verifying the identity of a particular user using the user's labeled voice model, create or adapt a speech recognition model that is specific to the particular user based on voice samples received from the particular user.

17. The non-transitory computer readable storage medium of claim 10 wherein the program code further causes the processor to, subsequent to the labeling:
 receive another voice sample that belongs to a particular user set; and
 update the voice model generated from the particular user set based on vocal characteristics of said another voice sample.

18. The non-transitory computer readable storage medium of claim 10 wherein the generated voice model is a text-dependent or text-independent voice model.

19. An electronic device comprising:
 a processor; and
 a non-transitory computer readable medium having stored thereon program code that, when executed by the processor, causes the processor to:
  receive a plurality of voice samples uttered by one or more users as they interact with a voice command-and-control feature of the electronic device;
  for each voice sample, assign the voice sample to one of a plurality of voice type categories;
  for each voice type category, group voice samples assigned to the voice type category into one or more user sets, each user set comprising one or more voice samples likely to have been uttered by a unique user in the one or more users; and for each user set:
  generate a voice model;
  issue, to the unique user, a request to provide an identity or name; and
  label the voice model with the identity or name provided by the unique user.

20. The electronic device of claim 19 wherein the assigning of the voice sample to one of the plurality of voice type categories is based on vocal characteristics of the voice sample.

21. The electronic device of claim 19 wherein the assigning of the voice sample to one of the plurality of voice type categories is further based on one or more other biometric factors associated with the utterance of the voice sample.

22. The electronic device of claim 19 wherein the grouping of voice samples assigned to the voice type category into one or more user sets is based on a quantity of the voice samples and similarity of vocal characteristics between the voice samples.

23. The electronic device of claim 19 wherein the program code further causes the processor to:
  use the labeled voice models to verify the one or more users' identities with respect to future voice queries or actions.

24. The electronic device of claim 23 wherein using the labeled voice models to verify the one or more users' identities with respect to future voice queries or actions comprises, for a particular user:
  allowing or disallowing a voice query or an action initiated by the particular user based on the particular user's identity and one or more permissions defined on the electronic device.

25. The electronic device of claim 23 wherein the program code further causes the processor to:
  upon verifying the identity of a particular user using the user's labeled voice model, create or adapt a speech recognition model that is specific to the particular user based on voice samples received from the particular user.

26. The electronic device of claim 19 wherein the program code further causes the processor to, subsequent to the labeling:
  receive another voice sample that belongs to a particular user set; and
  update the voice model generated from the particular user set based on vocal characteristics of said another voice sample.

27. The electronic device of claim 19 wherein the generated voice model is a text-dependent or text-independent voice model.

* * * * *